Figure 1:
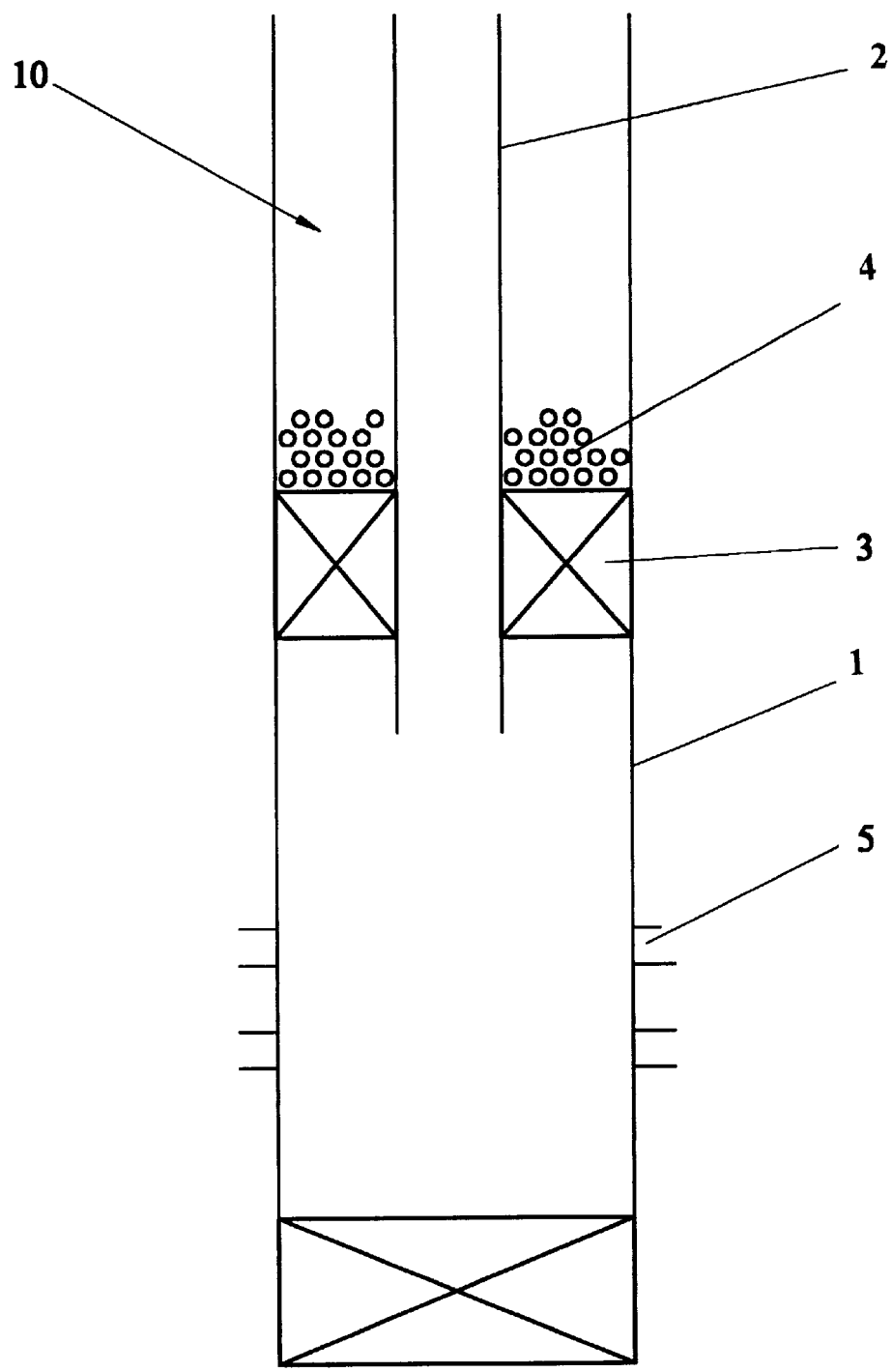

United States Patent
Keatch

[11] Patent Number: 6,131,657
[45] Date of Patent: Oct. 17, 2000

[54] METHOD FOR PREVENTING OR INHIBITING METAL DEPOSITION

[76] Inventor: Richard Keatch, c/o Keatch Chemicals, Unit 27, Frederick St. Centre, Aberdeen AB2 1HY, United Kingdom

[21] Appl. No.: 09/053,482

[22] Filed: Apr. 1, 1998

[51] Int. Cl.[7] .................................................. E21B 41/02
[52] U.S. Cl. ...................... 166/244.1; 166/371; 166/902
[58] Field of Search ..................... 166/902, 369, 166/371, 310, 244.1; 507/926

[56] References Cited

U.S. PATENT DOCUMENTS

| 4,157,732 | 6/1979 | Fonner | 166/902 X |
| 5,012,868 | 5/1991 | Bridges | 166/902 X |

OTHER PUBLICATIONS

Michell J. Sienko and Robert A. Plane, chemistry: principles and properties, pp. 295–298, 1966.

John O'M. Bockris and Amulya K. N. Reddy, Modern Electrochemistry: An Introduction to an Interdisciplinary Area, pp. 1269–1273, Oct. 1973.

*Primary Examiner*—George Suchfield
*Attorney, Agent, or Firm*—Madson & Metcalf

[57] ABSTRACT

A method for inhibiting or preventing the deposition of metals onto metallic surfaces, particularly the metal surfaces in an oil or gas well is disclosed.

24 Claims, 1 Drawing Sheet

METHOD FOR PREVENTING OR INHIBITING METAL DEPOSITION

This invention relates to a method for preventing or inhibiting the deposition of metal or minerals on to metallic surfaces, particularly the metallic surfaces within an oil or gas well.

Water present within the pores of permeable reservoir rock may contain elevated levels of radioactive metal species such as protactinium, thorium, radium, radon, polonium, bismuth, actinium, thallium and lead. These radioactive metals result from the natural decay of uranium-238 and thorium-232 which are sometimes present within oil reservoir rock formations. Of particular significance in an oil field are radium 226 and lead 210 isotopes which may lead to the contamination of metal surfaces of equipment and pipes involved in processing.

Moreover, mineral scale deposition may occur on surfaces (such as the surfaces of an oil drill) as a result of precipitation of water insoluble salts. These may be formed from the mixing of incompatible connate water present in the pores of the reservoir rock with injection water such as seawater. The connate water may be rich in, for example, calcium, barium and strontium ions and when mixed with sulphate-rich seawater may form sulphate scale. The deposition of scale on surfaces may result in production damage due to the formation of flow restrictions and there is generally a need to develop methods capable of preventing the formation of such deposits.

When obtaining oil or gas from oil or gas fields, it is generally necessary to drill some distance into the ground to gain access to a reservoir of gas or oil. The drilling produces a well which may be several thousands of feet in length. After drilling, the well is completed by insertion of casing tubes to form a casing. The completion of the well may involve several sections of casing tubes connected lengthwise over the lengths of the well. The casing tubes are formed from steel having a range of different metallurgies, but in general are formed from mild steel. It is frequently necessary to use casing tubes having different diameters in order to allow for variations in the diameter of the well along its length.

In order to extract fluids and/or gases from the reservoir, production tubing forming a pipe is inserted into the well in order to allow the fluid and/or gases to be extracted from the reservoir. Casing tubes have a larger internal diameter than the production tubing through which the fluids and gases flow. The production tubing is usually separated from the casing by means of a spacer seal known as a packer which is generally formed from a material capable of forming an effective seal under down hole conditions. The space between the casing and the pipe is generally in the form of an annulus. The number of packers in a well depends on the complexity of the well completion but usually there is a single packer in a well The materials used in the construction of packers are generally elastomeric and electrically non-conductive.

Fluids and gases flow from the casing into the more restricted pipe tubing by means of a tail pipe positioned in the area of the packer. The tail pipe is the end section of the production tubing which protrudes through the packer. During this procedure, conditions of flow and pressure may change so that, for instance, dissolved acid gases such as carbon dioxide may come out of solution and the alkalinity of the water may increase. The deposition of metal ions on to the surface of the tubing may then take place from solution either in metallic form or as a sparingly soluble salt when a cation reacts with an ion such as carbonate for instance.

Radioactive contamination of metal surfaces (eg equipment and pipes) in the oil well results mainly from the presence of radium-226 and lead-210 isotopes. The radioactive metal may form a springly soluble salt such as radium sulphate, or else deposit from solution in its metallic form, as often happens with lead.

It is known that the contamination of casing, tubing, tools and process equipment within a well by radioactive metallic salt deposits may be inhibited chemically by use of conventional scale inhibitors such as polycarboxylic acids or phosphorates or contamination may be removed using alkaline sequestering agents, when the radioactive deposit is a mineral scale such as radium sulphate. However, such methods are limited. For example, they cannot be used to inhibit the deposition of metallic lead on to metal surfaces. The mechanism of the deposition of metallic lead is not properly understood.

It has been recognised that, due to the change in conditions of flow and pressure which cause dissolved acid gas such as carbon dioxide to come out of solution and increase the alkalinity of the water, deposition of metal ions may take place from solution on to the surface of the tubing. In effect this means that an electrical cell is produced, the tubing and the casing being the cathode and the anode of the cell respectively because they are electrically insulated or separated from one another. The present invention is based on this recognition and seeks to overcome the limitations of the use of chemical means by utilising electrochemical means for inhibiting/preventing metal deposition.

According to a first aspect of the present invention, there is provided a method for preventing or inhibiting metal or mineral deposition on a metal surface in a device having a first metal surface and a second metal surface electrically separated from the first metal surface, with a fluid flowable in a space created between the first metal surface and the second metal surface, said fluid having a variable acidity, alkalinity, or ionic composition, the method comprising the step of electrically contacting the first metal surface to the second metal surface.

The invention is particularly useful in the oil and gas industry where the production of hydrocarbons is often accompanied by water containing for example naturally occurring radioactive materials.

Preferably, the first metal surface is casing tubing forming part of a well for extracting gas or oil from a gas or oil reservoir. Preferably the second metal surface is the surface of a production tubing forming part of a pipe for extracting gas or oil from a reservoir. Preferably the fluid is water containing naturally occurring radioactive material originating from within the pores of permeable reservoir rock.

According to a second aspect of the present invention there is provided an oil or gas well comprising casing tubing defining the wall of the well, and production tubing forming a pipe for transporting gas or oil through the well, the casing tubing and the production tubing both being formed from a metal, characterised in that the well further comprises means for electrically contacting the casing tubing to the pipe tubing.

Not wishing to be limited by any theoretical considerations, it is noted that the electrolyte is the produced water containing the naturally occurring radioactive materials present within the pores of the permeable reservoir rock. The difference in acidity at different locations within the well means that a potential difference is created between the tubing and the casing. The mechanism for deposition of metal in this instance thus involves the reduction of ions (for example lead-210 ions) on the tubing surface when that surface is rendered cathodic by the change in acidity of the produced water in contact with the two electrically separated tubes. The difference in acidity of the electrolytes in contact with the production tubing and casing surfaces causes a potential difference or voltage to be set up, the magnitude of which relates to the differential pH. The electrolyte is produced water and the difference in acidity caused by differential partial pressures of acid gases at different locations may not always be sufficient to cause the reduction of lead ions to metallic lead. However, a second pool of electrolyte may exist which is static, and contacts the tubing in the vicinity of a "rat-hole". A rat-hole is the term used to describe the space in a well lying below the perforated casing. It is a non-productive zone and tends to fill with aqueous fluids consisting of produced brines, treatment chemicals such as mineral acids or phosphoric acid scale inhibitors for instance, or a mixture of these. The electrolytic pool in the rat-hole may become rich in dissolved salts as a result of gas stripping moisture from produced brines and also become iron-rich due to the corrosion of the casing. Elevated dissolved iron levels and acidity may increase the potential difference across the casing and tubing so that the reduction of lead ions becomes thermodynamically favourable.

The method according to the present invention is capable of inhibiting this kind of electrochemical deposition of metal or mineral on to a metal surface.

In one preferred method of electrically contacting the tubing and the casing according to the first aspect of the present invention, there is no potential difference between the surfaces.

Advantageously, electrical contact is achieved by forming the packer (which is substantially cylindrical in shape but has an inner aperture formed within it) and an outer edge from a conducting material built into the main body of the packer, either in the form of an electrically conductive area or series of areas, electrically connecting the inner aperture and outer edge of the seal. This enables the tubing and casing to be short circuited by the packer. Alternatively, the electrical contact between the tubing and the casing is achieved by constructing the packer as a composite material with particulate metal as a filler so that the embedded metal particles are in physical contact with each other.

Other arrangements which allow current to pass from the tubing to the casing may also be used. For example, to avoid changing the packer from a conventional packer, the step of electrically connecting the tubing to the casing may comprise introducing a conducting material into the space formed between the tubing and the casing so that the conductive material may contact both the tubing and the casing. Preferably, solid lumps of metal may be used of any geometric shape and size. Such lumps of metal may be introduced into the well and may fall freely within the space formed between the tubing and the casing eventually accumulating on top of the packer and forming a conductive bridge between the tubing and the casing. Preferably the solid lumps of metal comprise substantially spherical steel balls. Use of a sufficient number of the metal balls will short circuit the cell created by the flow under normal well conditions.

Alternatively, tubing with a different metallurgy to the casing may be provided so that instead of a cathodic surface on the tubing, an anodic surface or neutral surface will be created. For example, stainless steel may be used to create the production tubing, whilst the casing tubing may be formed from mild steel.

The potential of the various surfaces involved in oil gas and water transportation and processing may be artificially controlled by directly supplying an electrical voltage to these surfaces by means of a power supply or metal of different electronegativity An alternative method for influencing the potential of the casing and production tubing surfaces is to introduce electrolyte into the rat-hole and/or the annulus of the packer by displacing the existing fluids with higher density solutions or soluble solid chemical for instance. The electrolyte system can be designed so that the various surfaces are rendered cathodic, anodic or neutral with respect to each other, as appropriate. The chosen method will depend on a number of factors, but must also take into account corrosion and evolution of gases such as hydrogen for example.

In an alternative embodiment of the invention it may be advantageous to provide an anodic and a cathodic surface rather than reducing the potential difference between the first and second surfaces to zero. The provision of anodic and cathodic surfaces may have an effect on the formation of mineral scale deposits on the surfaces.

It may thus be desirable to provide an anodic surface to help prevent or inhibit the formation of certain mineral scales such as barium sulphate and calcium carbonate. This may take the form of a coating on the surfaces eg. a coating of sparingly soluble scale inhibitor layered onto the surface by suitable choice of electrolyte.

In a preferred embodiment, the present invention may be used to form coatings which have deposit (eg. scale) inhibiting and corrosion inhibiting properties. One example of a corrosion inhibitor is $Fe_2O_3$. The potential required will depend on the water chemistry of the electrolyte including such factors as pH, ionic composition and the metallurgy of the surfaces of all the pipes and/or process equipment forming part of the electrochemical cell.

The thickness of the coating may be controlled by careful choice of parameters such as potential, current, electrolyte, electrode materials, temperature and time. The coating formed can be dehydrated to form a tenacious crystalline layer on metal surfaces involved in production and processing which can then be either incorporated or continue to be used in the system Scale inhibiting chemical may be released at a controlled rate in production fluids to inhibit the formation of mineral scale deposits. Alternatively the coating formed may be left as a hydrated sticky layer or concentrated fluid depending on the particular application. A further option involves controlling the solubility of the scale inhibitor layer by providing further generally but not exclusively lower solubility chemicals into the electrolyte which can be used to coat onto or coprecipitate with the scale inhibitor.

Other inhibitory chemicals can be made to coat onto chosen surfaces using the same principles already outlined in order to impart various other beneficial inhibitory properties such as inhibition/prevention of bacterial or biological growth, hydrocarbon deposition such as waxes and asphaltenes, corrosion control and control and/or scavenging of gases such as hydrogen sulphide and oxygen for instance. The chemicals use for these purposes will generally be chosen from those already in common use in liquid form where their chemistry is suitable for this method of application onto surfaces. Conditions for coating these chemicals onto various surfaces in various chemical and physical forms is individually tailored to suit the particular chemical and application.

The present invention is advantageously used in corrosion inhibition of a metal surface, particularly where pitting corrosion is present. In this case the pitted areas may be protected against further corrosion attack. An oxide or other passive layer may be formed on the metal surface by applying a potential to the metal surface in the presence of a suitable electrolyte and secondary electrode. This layer may also have scale inhibiting and/or metal deposition inhibiting properties depending on the choice of electrolyte and on the metallurgy of the metal surface so protected.

In accordance with the invention, the electrolytic cell may be created by the flow of naturally present aqueous fluids from the hydrocarbon reservoir to the surface. Alternatively, different electrolyte solutions can be introduced into the well artificially and temporarily in order to create an electrolyte cell in the well under static conditions. This method may be used as a means of treating metal surfaces within the wells in order to produce surfaces with properties which are beneficial to the efficient production of oil and gas.

Two solutions may be introduced into the well by bullheading. The term bullheading refers to the introduction of fluids into the well from the surface by displacement of existing well fluid contents back into the reservoir. This is achieved by pumping the fluids from the top of the production tubing down the production tubing. Each of the two solutions would be pumped into the well sequentially, displacing the fluid already in the well. The first solution introduced into the well has a greater density than the second so there is little tendency for the fluids to mix. The solutions thus remain as discrete columns of solution sitting one above the other.

The acidity and/or chemical composition of the two solutions can be adjusted prior to pumping into the well such that a potential is created between the different surface areas in contact with the different electrolytes. Useful chemicals could be included into the electrolyte such that when a positive or negative potential is created on the surface of the pipe, the chemical deposits on to the surface of the pipe imparting some useful property to the surface of any well fluid or gas coming into contact with the treated surface. For example, the method could be applied to apply scale inhibitor such as sodium hexametaphosphate for example when introduced along with a metal salt such as calcium chloride.

In other words, by means of the present invention the ability to create a potential on various surfaces in a well may be utilised to treat those surfaces. Fluid contacting the casing and the production tubing may comprise two or more different solutions.

The invention will now be described by way of example and with reference to the accompanying drawing in which:

FIG. 1 is a schematic representation of an oil or gas well cooperating the present invention.

Referring to FIG. 1, an oil well comprises casing tubing (1) defining the walls of the well. Within the well is a pipe (2) formed from production tubing. The production tubing and the casing are spaced apart from one another to define an annular space (10). The production tubing is spaced apart from the casing by means of a packer (3) which is generally cylindrical in shape but has an aperture formed centrally which aperture is substantially circular in cross section and allows the production tubing (2) to be held securely within the packer.

The annular space (10) is filled with steel balls (4) which serve to form an electrical contact between the casing (1) and the production tubing (2). This short circuits the production tubing (2) and the casing (1) reducing the potential difference between the two surfaces to zero thus preventing or inhibiting deposition of metals such as metallic lead on to either the surface of the production tubing (2) or the inner surface of the casing (1).

The method of the invention will be illustrated in the following non-limiting example

EXAMPLE

An electrolyte comprising a solution of scale inhibitor, sodium hexametaphosphate and a crosslinking agent or salt such as calcium chloride may be used to form a layer of sparingly soluble scale inhibitor on a metal surface by applying to the surface a positive potential relative to a second electrode (a cathode) in electrical contact with the same electrolyte. The thickness of the coating formed may be carefully controlled by careful choice of parameters such as potential, current, electrolyte, electrode materials, temperature and time. The coating formed can be dehydrated to form a tenacious crystalline layer on metal surfaces involved in production and processing which can then be either incorporated or continue to be used in the system.

What is claimed is:

1. A method of preventing or inhibiting deposition of radioactive metal species and/or mineral scale onto a metal surface in a well used for extracting gas or oil from a gas or oil reservoir, said well having a first metal surface and a second metal surface electrically separated from the first metal surface, with an electrolyte flowable in a space created between the first and the second metal surface, wherein said electrolyte is water containing naturally occurring radioactive material resulting from the natural decay of uranium-238 and thorium-232 and originating from within the pores of permeable reservoir rock, wherein said electrolyte has localized composition variations adjacent said first and second metal surfaces such that said electrolyte creates localized potential difference variations between the first surface and the second surface, said method comprising the step of electrically contacting the first metal surface to the second metal surface.

2. A method as claimed in claim 1 wherein the first and second metal surfaces are contacted in a manner such that there is no potential difference therebetween.

3. A method as claimed in claim 1 wherein the first and second metal surfaces are contacted in a manner which renders the first and second metal surfaces anodic and cathodic.

4. A method as claimed in claim 3 wherein said first metal surface is coated with a coating having inhibitory properties.

5. A method as claimed in claim 4 wherein the coating exhibits corrosion or scale inhibiting properties.

6. A method as claimed in claim 1 for preventing or inhibiting the deposition of lead.

7. A method as claimed in claim 1 wherein said first metal surface is the surface of a casing tubing and said second metal surface is the surface of a production tubing forming part of a pipe for extracting gas or oil from a reservoir.

8. A method as claimed in claim 7 wherein the casing tubing and production tubing are separated by means of a packer.

9. A method as claimed in claim 1 wherein the first metal surface and the second metal surface are made of steel.

10. A method as claimed in claim 9 wherein the first metal surface is mild steel and the second metal surface is stainless steel.

11. A method as claimed in claim 5 wherein the coating is $Fe_2O_3$.

12. A method as claimed in claim 1 wherein said electrolyte exhibits a pH difference at the first and second metal surface which creates a potential difference between the first surface and the second surface.

13. A method as claimed in claim 1 wherein said electrolyte exhibits a difference in ionic composition at the first and second metal surface which creates a potential difference between the first surface and the second surface.

14. A method as claimed in claim 13 wherein the difference in ionic composition is caused by the presence of a static electrolytic pool in contact with the second metal surface.

15. A method as claimed in claim 14 wherein the static electrolytic pool is situated in a rat-hole.

16. A method as claimed in claim 12 wherein the pH difference is caused by the removal of acidic gases dissolved in the electrolyte due to changes in flow and pressure conditions in the electrolyte.

17. A method as claimed in claim 16 wherein the acidic gas is carbon dioxide.

18. A method as claimed in claim 8 wherein the packer comprises conducting means for short circuiting the tubing and casing.

19. A method as claimed in claim 8 wherein the tubing and casing are contacted by introducing conductive material in the space between the tubing and casing.

20. A method as claimed in claim 19 wherein the conductive material is in the form of steel balls.

21. A method as claimed in claim 1 further comprising introducing a second electrolyte in contact with either or both of the first and second metal surface.

22. A method as claimed in claim 1 wherein the first and second metal surface are contacted through an electrical power supply.

23. A method as claimed in claim 1 for preventing or inhibiting mineral scale deposition.

24. A method as claimed in claim 1 wherein the radioactive metal species is protactinium, thorium, radium, radon, polonium, bismuth, actinium, thallium, or lead.

* * * * *